Sept. 22, 1959          J. E. FIELDEN          2,905,875
            MOTION TRANSDUCING SERVOSYSTEM
                   Filed Nov. 7, 1956
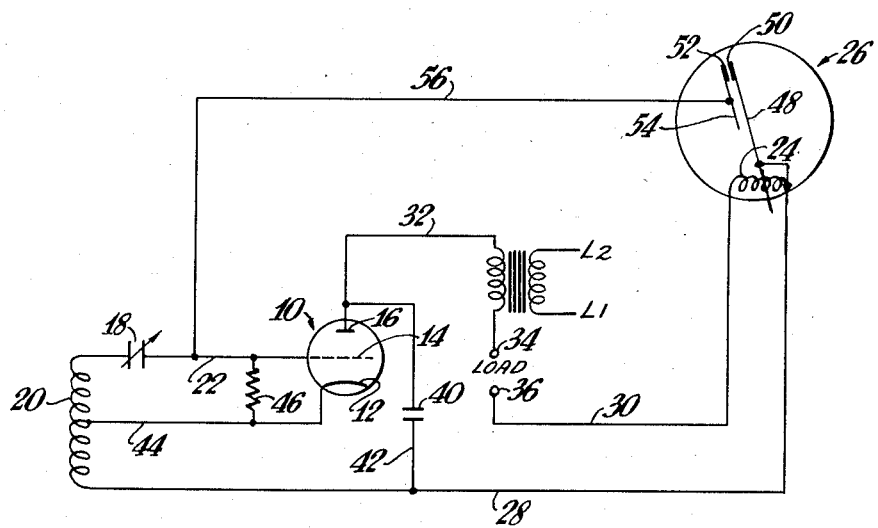
INVENTOR.
John E. Fielden.
BY
HIS ATTORNEY.

United States Patent Office 2,905,875
Patented Sept. 22, 1959

2,905,875

MOTION TRANSDUCING SERVOSYSTEM

John E. Fielden, Sale, England, assignor, by mesne assignments, to Fielden Electronics Ltd., Manchester, England, a British company Application November 7, 1956, Serial No. 620,979

4 Claims. (Cl. 318—31)

This invention relates to a device for transducing mechanical movements into proportional changes in electrical currents, and more particularly to a device of this nature which is substantially unaffected by variations in line voltage or other parameters of the circuit.

It is an object of this invention to transduce a mechanical movement into a proportional electric current by means of a circuit which is substantially unaffected by variations in line voltage or other parameters of the circuit.

In one preferred embodiment of the invention, a condenser plate is arranged to be displaced by a mechanical movement. A second condenser plate is capacitatively associated with the first condenser plate and arranged to be displaced relative thereto by an electrical measuring instrument. The two plates form a variable capacitor for controlling an oscillator circuit so as to produce changes of anode current corresponding to changes of capacitance of the two plates. The electrical measuring instrument is so connected in the anode circuit of the oscillator circuit that a change in anode current due to displacement of the first condenser plate moves the second condenser plate in the same direction as the first.

Other objects and advantages will become apparent from the following description taken in connection with the accompanying drawing which is a schematic showing of an electrical transducer embodying this invention.

Referring more particularly to the drawing, the transducer includes an electron discharge oscillator tube indicated generally by the reference numeral 10 and having a cathode 12, a grid 14, and an anode 16. The tube 10 is connected in a conventional Hartley oscillator circuit and has the grid 14 thereof connected through a variable condenser 18 to one end of a coil 20 by a conductor 22. The other end of the coil 20 is connected to one end of a moving coil 24 of a moving coil meter system, indicated generally by the reference numeral 26, by a conductor 28. The other end of the coil 24 is connected by a conductor 30 to one end of a secondary winding of a transformer of a source which is connected to a suitable alternating voltage by conductor 30. To complete the anode circuit, the other end of the secondary winding of the transformer is connected to the anode 16 by a conductor 32. A pair of output terminals 34, 36 may be provided in the conductor 30 for supplying anode voltage to a suitable load such as an indicating or control device (not shown).

The anode 16 is connected through a capacitor 40 by a conductor 42 to the conductor 28. A conductor 44 connects the cathode 12 to a centre tap of the coil 20, and a conventional grid leak resistor 46 is connected across the grid 14 and cathode 12.

The tube 10, in association with the coil 20, capacitors 18, 40 and resistance 46, operates as a conventional Hartley oscillator. In this case, the anode current is fed through the moving coil 24. Coupled in this way, the angular deflection of the coil 24 would be dependent upon the mean anode current of the tube 10.

Attached to the moving coil 24 is a light arm 48 carrying a flat plate 50, which is electrically connected to the moving coil 24, the plane of the plate 50 passing through the pivot point of the coil 24. A similar plate 52 is suspended from another light arm 54 and is arranged to rotate about the same axis as the plate 50. The arm 54 is arranged to be rotated by a movement to be transduced and is in electrical contact with the plate 52.

The plate 52 is connected to the grid 14 by a conductor 56, hence the feedback potential between the grid and cathode of the tube 10 will be dependent upon the relative capacities of the variable capacitor 18 and the capacity between the two plates 50, 52. When the capacities of capacitors 18 and 50, 52 are equal the feedback potential is zero, and when the capacity of capacitor 18 is slightly greater or much greater than that of capacitor 50, 52 radio frequency oscillation occurs. Oscillation will not occur when the capacitance of capacitor 18 is less than that of capacitor 50, 52. Due to grid rectification, the mean anode current of the tube 10 will vary inversely with the amplitude of oscillation. For a given position of the externally driven plate 52, the circuit will settle in a condition where the capacity between the two plates 50, 52 is that value which provides the coupling required to maintain oscillation at the amplitude which results in an anode mean current of such a magnitude that the electrically driven plate 50 is held in the position forming the appropriate capacity between the plates 50, 52. The mean anode current and hence the spacing of the two plates 50, 52 can be controlled by adjustment of the variable capacitor 18 and is so adjusted that the two plates 50, 52 are very closely spaced.

In operation the circuit is adjusted so that the spacing of the plates 50, 52 is small and any movement of one in relation to the other immediately changes the amplitude of oscillation and thus the current through the moving coil 24, which immediately restores the spacing between the plates 50, 52 to the original value. If the condenser plate 52 should be rotated counterclockwise in response to a change in the movement to be transduced, a reduction in the capacity between the plates 50, 52 will occur resulting in an increase in impedance of the plates 50, 52 thereby causing the amplitude of the oscillatory potential of the grid 14 to increase. This increased amplitude reduces the mean anode current of the tube 10, and the electrically driven plate 50 rotates in a similar counterclockwise direction to increase the capacity between the plates 50, 52 to its previous capacity. As the deflection of the electrically driven plate 50 is proportional to the current through the coil 24, the change in current due to a movement of the mechanically driven plate 52 is directly proportional to the mechanical movement thereof.

The above proportionality is maintained regardless of changes in the potential of the source L1, L2 or regardless of changes in the characteristics of the tube 10. A change in the potential of the source L1, L2 which might effect the anode current of the tube 10 immediately changes spacing of the condenser plates 50, 52 which self-correct and return to their original position. Thus the device operates as a closed feedback loop which is intrinsically stable and substantially immune from effects of voltage variations of the source or other parameters of the circuit. Variations in the supply voltage or circuit parameters will only affect the size of the gap between the two plates 50, 52, and, if the initial spacing is made small in relation to the movement to be transduced, these variations are negligible.

It will be apparent that by means of the output terminals 34, 36 the anode current can be impressed on an external circuit to remotely indicate the mechanical movement.

While only one embodiment of the invention has been herein shown and described, it will be apparent to those skilled in the art that many changes may be made in the construction and arrangement of parts without departing from the scope of the invention as defined in the appended claims.

It is claimed and desired to secure by Letters Patent:

1. In a control device, the combination comprising an electron discharge tube having an anode, a cathode and a grid, a tank circuit coupled to said anode and grid for oscillating said tube, a variable impedance associated with said tank circuit for varying the amplitude of oscillation in said tube, means for changing the value of said impedance from an initial value to a predetermined value to effect a change in anode current of said tube, and means including a meter coil conductively connected to the anode of said discharge tube and responsive to changes in the anode current for changing the value of said impedance from said predetermined value responsive to changes therein to said initial value.

2. In a control device having a source of voltage, the combination comprising an electron discharge tube having an anode, a cathode and a grid, an oscillatory tank circuit coupled to said grid for oscillating said tube, means for connecting one side of the source to said tank circuit and the other side thereof to said anode, means for connecting said cathode to said tank circuit, a variable impedance associated with said tank circuit for controlling the amplitude of oscillations in said tube, means for changing the value of said impedance from an initial value to a predetermined value to effect a change in current flow between said anode and the source, and means including a meter coil responsive to the change in current flow between said anode and said source and electrically interconnected therebetween for changing the value of said impedance from said predetermined value to said initial value.

3. In a control device having a source of alternating voltage, the combination comprising an electron discharge tube having an anode, a cathode and a grid, an oscillatory tank circuit coupled to said grid for oscillating said tube, means for connecting one side of the source to said tank circuit and the other side thereof to said anode, means for connecting said cathode to said tank circuit, a variable capacitor comprising a pair of movable condenser plates associated with said tank circuit for controlling oscillations in said tube, one of said plates being movable relative to the other to change the amplitude of oscillations in said tube and the current flow between said anode and the source, and means connected between said anode and source for positioning said other plate relative to said one plate in response to the change in current flow between said anode and said source.

4. In a control device having a source of voltage, the combination comprising an electron discharge tube having an anode, a cathode and a grid, an oscillatory tank circuit coupled to said grid for oscillating said tube, means for connecting one side of the source to said tank circuit and the other side thereof to said anode, means for connecting said cathode to the electrical centre of said tank circuit, a movable coil element connected in series with said anode and said source and movable in response to a change in anode current, a condenser plate electrically connected to said movable coil and mounted for movement therewith, a second condenser plate connected to said grid movable relative to the first said condenser plate to change the amplitude of oscillations in said tube and the magnitude of anode current, the first said condenser plate and said coil being movable by said change in anode current in the same direction as said second plate to effect said change to thereby maintain the spacing between said plates substantially constant.

References Cited in the file of this patent

UNITED STATES PATENTS

| | | |
|---|---|---|
| 2,423,617 | Rath | July 8, 1947 |
| 2,464,193 | Wild | Mar. 8, 1949 |
| 2,467,335 | Rath | Apr. 12, 1949 |